United States Patent [19]

Chiang

[11] 4,375,456

[45] Mar. 1, 1983

[54] METHOD OF PRODUCING SODIUM ALUMINUM PHOSPHATE

[75] Inventor: John S. C. Chiang, Mercerville, N.J.

[73] Assignee: FMC Corporation, Philadelphia, Pa.

[21] Appl. No.: 353,668

[22] Filed: Mar. 1, 1982

[51] Int. Cl.$^3$ .............................................. C01B 25/26
[52] U.S. Cl. .................................. 423/306; 423/305; 423/312; 426/563
[58] Field of Search ............... 423/305, 306, 312, 315, 423/265; 426/563

[56] References Cited

U.S. PATENT DOCUMENTS

| | | | |
|---|---|---|---|
| 2,550,490 | 4/1951 | McDonald | 23/105 |
| 2,957,750 | 10/1960 | Knox, Jr. et al. | 23/105 |
| 2,995,421 | 8/1961 | Dyer | 23/105 |
| 3,097,949 | 7/1963 | Lauck et al. | 99/115 |
| 3,223,479 | 12/1965 | Vanstrom | 23/107 |
| 3,311,448 | 3/1967 | Blanch et al. | 23/105 |
| 3,411,872 | 11/1968 | Post et al. | 23/105 |
| 3,957,679 | 5/1976 | Kichline et al. | 252/351 |
| 4,260,591 | 4/1981 | Benjamin et al. | 423/306 |

Primary Examiner—O. R. Vertiz
Assistant Examiner—Gregory A. Heller
Attorney, Agent, or Firm—Robert D. Jackson; Frank Ianno

[57] ABSTRACT

A method of spray drying 1-3-8 sodium aluminum phosphate reaction mixtures by the steps:

(A) forming an aqueous 1-3-8 SALP reaction mixture by reacting $Na_2CO_3$, $Al(OH)_3$ and $H_3PO_4$ in a Na:Al:PO$_4$ atomic ratio of 1:3:8 at a water content between about 30% and about 48% and in the presence of an effective amount of a non-toxic, substantially, water soluble metal sulfate as a precipitation inhibitor;

(B) adding sufficient water to (A) to form a sprayable solution, and (C) spray drying the solution of (B) and recovering the dried product.

7 Claims, No Drawings

METHOD OF PRODUCING SODIUM ALUMINUM PHOSPHATE

This invention relates to sodium aluminum phosphates, and in particular to a novel method of recovering 1-3-8 sodium aluminum phosphates.

Sodium aluminum phosphate (commonly designated by the acronyms SAP and SALP) is the generic name for a class of complex sodium aluminum acid orthophosphates which find extensive use as leavening agents for various kinds of baked goods. The compound of the formula $NaAl_3H_{14}(PO_4)_8 \cdot 4H_2O$ or 1-3-8 SALP for short (disclosed in U.S. Pat. No. 2,550,490) is presently the most commercially important member of the group. A dehydrated version of 1-3-8 SALP having the formula $NaAl_3H_{14}(PO_4)_8$ (U.S. Pat. No. 2,957,750) and an amorphous type having the formula $NaAl_3H_{11}(PO_4)_7 \cdot 5\text{-}8H_2O$ (U.S. Pat. No. 2,995,421) are also known. Other compounds, falling generally within the ambit of the formulae aforesaid, but exhibiting specific properties or parameters, for example, reactivity, acidity, x-ray diffraction, etc., have likewise been reported.

In preparing SALP tetrahydrate, a reactive trivalent aluminum compound such as the metal itself or its hydroxide and a reactive sodium compound such as sodium hydroxide or carbonate are added to a solution of phosphoric acid. The sodium and aluminum compounds are present in stoichiometric proportions to provide three aluminum atoms per sodium atom while there is at least sufficient phosphoric acid to react with all of the sodium and aluminum compounds. After heating the reaction at a temperature from about 70° C. to 110° C., there is formed a clear viscous solution which is concentrated by boiling to drive off water and cause crystallization. As water is removed, the viscosity of the solution increases and rises markedly with formation of finely divided SALP tetrahydrate crystals. Concentration is continued until crystallization is complete. The resulting product consists of SALP tetrahydrate crystals embedded in a highly viscous or even gelatinous matrix. Such unusual viscosities may be due to intense hydrogen bonding between the crystals and phosphoric acid solution. The unit of viscosity is the centipoise which is equal to 0.001 pascal second (Pa.s). Some idea of the viscous nature of the materials herein can be had by referring to U.S. Pat. No. 3,311,448, which contains the following statement at column 1, lines 52-60:

"The high viscosities encountered in the production of sodium aluminum acid orthophosphates are difficult to express quantitatively since they are outside of the range of ordinary viscometers (perhaps in the range of 100,000 to 200,000 centipoises). Roughly, the viscosity of the phase present immediately before crystallization in the batch process is about equivalent to that exhibited by plastic asphalts (low-petroleum volatiles types)."

From the foregoing, it is evident that the usual methods of separating crystals from their crystallization medium, that is, filtration, decantation or centrifugation are not directly applicable to highly viscous sodium aluminum phosphate crystal suspensions. These materials require special handling to recover the SALP tetrahydrate; two techniques are generally used.

The first of these is described in the aforecited U.S. Pat. No. 2,550,490 and is known as the methanol process. It consists of adding aqueous methanol to the viscous SALP tetrahydrate crystallization mixture under vigorous agitation. Typically about two volumes of a 75% methanol-25% water (by volume) are used. Aqueous methanol breaks up the viscous mass to give a mobile slurry of SALP tetrahydrate crystals which are readily recovered by conventional means, that is, filtration or centrifugation. The recovered crystals are washed with aqueous methanol, then with methanol alone to remove free phosphoric acid and dried at about 70° C.

Although generally satisfactory for working up the highly viscous SALP tetrahydrate crystallization mixtures, the methanol process is objectionable in requiring the use of methanol, a highly flammable and toxic substance. In fact, FDA regulations specify that all traces of methanol must be removed from the food grade product.

The second procedure, for recovering SALP tetrahydrate, commonly referred to as the Kneadermaster process, is described in U.S. Pat. No. 3,311,448. In this process, a conveyable reaction mixture is first prepared by heating stoichiometric amounts of alkali metal, aluminum and phosphoric acid reactants and 9.5% to 44% water until reaction is complete. The resulting mixture is then passed into a heated crystallization zone where it is concentrated to promote crystallization.

The crystallization zone must provide a kneading-conveying type of agitation whereby incoming liquid feed is quickly kneaded into a dough-like bed of SALP and slowly moved away from the point of entry. As the SALP feed passes through the crystallization zone, which is maintained at elevated temperatures, it is concentrated by removal of free water thereby causing crystallization to occur on previously introduced feed crystals. The kneading action during evaporative crystallization is provided by a kneader-conveyor device, usually of the design typified by the well known Kneadermaster and Ko-kneader. These consist of a horizontal trough in which is located an agitator and heat exchange means, for example, a heating jacket. The unit may be enclosed and provided with means for sweeping heated air over the bed of SALP, or it may simply comprise an open trough. The liquid feed is normally supplied near one end of the kneader-conveyor trough and crystalline product recovered from the other end. As the evaporation proceeds, the viscosity of the SALP feed greatly increases, approaching values of the order of 100,000 centipoises. Needless to say, heavy duty, powerful agitation means must be resorted to for handling the gelatinous feed. Consequently, the Kneadermaster process requires considerable capitol outlays for plant and oversized mixing equipment. This, coupled with the need for high energy input to operate such machinery constitutes serious economic objections to the Kneadermaster process. Moreover, the water content must be carefully controlled to maintain the viscosity of the initial reaction mixture at relatively low levels, that is, 4,000 to 24,000 centipoises and to prevent formation of white precipitates. Such precipitation is suppressed in the presence of phosphoric acid. However, the Kneadermaster process cannot tolerate phosphoric acid since it would not be removed during evaporation but remain behind and thereby cause contamination of the final product.

Spray drying is another known technique for the processing of SALP reaction mixtures and in this connection reference is hereby made to U.S. Pat. No. 2,995,441. According to this document, amorphous 1-3-7 SALP $[NaAl_3H_{11}(PO_4)_7 \cdot 5\text{-}8H_2O]$ is prepared by adding $Na_2CO_3$ and $Al(OH)_3$ to $H_3PO_4$ and the contents heated at 80° C. for 5 hours and the resulting 70% SALP solution cooled, diluted to 40% and unreacted materials removed by filtration. The filtrate is treated with additional $Na_2CO_3$ and the solution spray dried. Apparently, the filtration is to remove both unreacted starting components and hydrolytic insolubles, the latter being a phenomenon attendant the preparation of 1-3-8 SALP solution as previously described. Moreover, the method of this patent appears complicated and difficult to control, that is, it requires such steps as by-product solids separation and the use of $Na_2CO_3$ to neutralize excess phosphoric acid prior to spray drying. Quite clearly, the final product would contain considerable extraneous material from the neutralization.

A method has now been discovered of working up 1-3-8 SALP reaction mixtures which obviates the drawbacks aforesaid and which provides the 1-3-8 SALP in an amphorous form. The provision of said method and amorphous 1-3-8 SALP produced thereby constitutes the principal object and purpose of the invention. Other objects and purposes will be made evident in the ensuing description.

In carrying out the invention, a 1-3-8 SALP reaction mixture is prepared generally in the known manner by forming an aqueous mixture of $Na_2CO_3$, $Al(OH)_3$ and $H_3PO_4$ in an $Na:Al:PO_4$ atomic ratio of 1:3:8 but keeping the water content at about 30% to about 48% (about 52% to about 70% SALP) preferably about 40% to about 45% (preferably about 55% to about 60% SALP). Pursuant to the invention, there is incorporated in the resulting SALP reaction mixture, as a precipitation inhibitor, an effective amount of a non-toxic, substantially water soluble metal sulfate, preferably an alkali or alkaline earth metal sulfate. The SALP reaction mixture is next diluted with water to a SALP concentration of about 10% to 55% and the resulting clear SALP solution subjected to spray drying using standard spray drying procedures and equipment. The resulting amorphous 1-3-8 SALP product can be represented by the following formula:

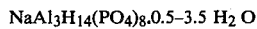
$NaAl_3H_{14}(PO_4)_8 \cdot 0.5-3.5\ H_2O$

In preparing the 1-3-8 SALP aforesaid, the $Na_2CO_3$ is added to the phosphoric acid solution at room temperature to avoid excessive foaming from the evolution of $CO_2$ and heat. After the $Na_2CO_3$ is dissolved the solution is heated from about 70° C. to about 110° C., preferably from about 80° C. to about 100° C. During this heating interval, $Al(OH)_3$ is then introduced at such a rate as to avoid lump formation and boil over effective agitation or stirring is maintained when adding the ingredients and to keep them dispersed in the reaction vessel. Incorporation of the precipitation inhibitor salt can be made before or during the $Na_2CO_3$ and $Al(OH)_3$ addition. Examples of suitable inhibitor salts include $Al_2(SO_4)_3$ $Na_2SO_4$, $K_2SO_4$, and other sulfate containing compounds. Generally, from 0.1 to 5%, preferred about 0.5% to about 1.0% of inhibitor based on the weight of the SALP (as $NaAl_3H_{14}(PO_4)_8$) in the reaction mixture constitutes an effective quantity for suppressing unwanted precipitation. Such unwanted precipitation is believed to be caused by hydrolytic decomposition of the 1-3-8 SALP and is sometimes referred to in the art as "white precipitate." After all of the ingredients have been added, the reaction mixture is held at a temperature of about 40° C. to about 110° C., preferably at about 80° C. to about 110° C. for about 1 to about 5 hours, preferably about 2.5 to about 3 hours; agitation is maintained during this period; water is added from time to time to compensate for evaporative losses.

The SALP reaction mixture, which is clear and free of suspended solids, is cooled to room temperature and diluted with water under vigorous agitation. The diluted clear solution contains about 10% to about 55%, preferably about 25% to about 40% SALP and has a very low viscosity of from about 0.004 to about 0.5 Pa.s (4 to 500 cps).

The diluted SALP solution is fed to a spray nozzle of a spray drier. The solution is atomized and dried. The solution feed rate and the inlet temperature are monitored to produce an outlet temperature of about 100° C.-250° C., preferably about 125° C. to 175° C. The product is collected using a cyclone outside the spray chamber. The feed may be heated to 60° C. to reduce viscosity prior to spray drying when the feed contains greater than 40% SALP.

The x-ray diffraction pattern for the spray dried product is fogged or blank, but sometimes shows some minor peaks. This indicates the product is amorphous in nature and may be mixed with some very minor amount of some crystalline materials. The exact nature of the crystalline materials is difficult to identify because the number, d-spacings and intensities of the minor peaks vary with the feed solution and the spray drying conditions. Moisture analyses shows the product contains 1% to 7% $H_2O$. Accordingly, the product may be represented by the following empirical formula:

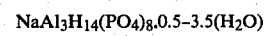
$NaAl_3H_{14}(PO_4)_8 \cdot 0.5-3.5(H_2O)$

Analyses show the product has a neutralizing value of 106 to 110, which is slightly higher than 100 to 102 normally obtainable from commercial acidic 1-3-8 SALP. Neutralizing value is the amount of $NaHCO_3$ required by weight to neutralize the acidity of 100 parts by weight of a baking acid. Baking tests show the product acts as a leavening acid producing a cake volume comparable to that of commercial baking powder and crystalline acidic 1-3-8 SALP.

Monocalcium phosphate ($Ca(H_2PO_4)_2 \cdot H_2O$) or tricalcium phosphate ($Ca_5(PO_4)_3OH$) commonly added to the commercial SALP, as a supplemental baking acid, may be added to the feed solution of present invention prior to spray drying. These compounds may also be prepared in situ by adding excess $H_3PO_4$ to the SALP reaction mixture during initial makeup, then adding lime to the reacted reaction mixture. Other additives such as $KH_2PO_4$, $K_2SO_4$ or crystalline 1-3-8 SALP may be added to the feed solution prior to spray drying to control the quality such as moisture content and bulk density of the product.

Reference is now made to the following non-limiting examples.

EXAMPLE 1

About 4.4 Kg of a 55% acidic 1-3-8 SALP reaction mixture was prepared in an open 4-liter beaker by adding 136 g of $Na_2CO_3$ to an aqueous mixture containing 2674 g of a 75.6% food grade $H_3PO_4$ and 1096 g of water. The $Na_2CO_3$ addition was carried out slowly at room temperature to avoid excessive foaming. After the $Na_2CO_3$ dissolution was completed, the resulting solution was heated to 80° C.-100° C. and 604 g of $Al(OH)_3$ was added slowly with good agitation to avoid lump formation and boil over. The chemical addition took slightly over an hour. The resulting solution was held at 80° C.–100° C. for 3 hours with good agitation. Room temperature water was added periodically to compensate for evaporation.

A total of 9 batches of the above reaction mixture were prepared. Six batches resulted in clear solutions; three batches produced a permanent white precipitate. The clear solution was cooled to room temperature and diluted to 35% SALP with room temperature water. The diluted solutions were spray dried using an 0.76 m (30"), gas-fire spray drier at an outlet temperature of 100° C., 125° C., 150° C. and 200° C. The products were analyzed using x-ray diffraction techniques; results are shown below.

| SAMPLE NUMBER | OUTLET TEMPERATURE, °C. | X-RAY DIFFRACTION PATTERN |
|---|---|---|
| 1 | 100 | fogged |
| 2 | 125 | fogged |
| 3 | 150 | fogged with 11 small peaks |
| 4 | 200 | fogged with 6 small peaks |

Samples No. 1 and 2 showed fogged or blank x-ray diffraction patterns indicating the products are amorphous in nature. Samples No. 3 and 4 showed fogged x-ray diffraction patterns but also showed some small peaks. These small peaks have different d-spacings and intensities for the two samples. This seems to indicate that samples No. 3 and 4 are amorphous in nature but also contain some minor amounts of crystalline materials not easily identified.

Moisture determinations showed Sample No. 2 contained 7% water. From the starting raw materials, x-ray diffraction pattern and the moisture content, sample No. 2 seems to be an amorphous material with the following empirical formula:

$NaAl_3H_{14}(PO_4)_8 \cdot 3.5H_2O$

Sample No. 2 was further analyzed using techniques shown in Food Chemical Codex, second edition, National Academy of Sciences, Washington, DC, 1972. The technique was specifically developed for crystalline acidic 1-3-8 SALP ($NaAl_2H_{14}(PO_4)_8 \cdot 4H_2O$). Results are tabulated below.

| | CODEX SPECIFICATIONS | SAMPLE NO. 2 |
|---|---|---|
| Assay, % | >95 | 100.0 |
| NV[1] | >100 | 110 |
| LOI, % | 19.5–21 | 17.6 |
| As, ppm | <3 | 0.42 |
| F, ppm | <25 | <1.0 |
| H.M.,[2] | <40 | <40 |
| Pb, ppm | <10 | 0.30 |

[1]NV — neutralizing value which represents the amount of sodium bicarbonate required by weight to neutralize the acidity of 100 parts by weight of a baking acid.
[2]H.M. — Heavy metal as lead.

The above table shows the spray dried amorphous acidic 1-3-8 SALP exceeds the Codex specifications except the LOI values. The spray dried SALP has a lower LOI value than that of Codex specifications. This may be because the spray dried SALP has less bonded water and different chemical structure as compared to crystalline SALP. The Codex specifications were developed for crystalline SALP.

A baking test was carried out to compare the spray dried SALP with crystalline SALP and commercial baking powder containing SALP (Fleishmann) in a layer cake system. The layer cake formula and procedure is attached; data on cake volume is shown below:

| | CAKE VOLUME, ml |
|---|---|
| Spray dried 1-3-8 SALP of the invention | 1096 |
| Commercial baking powder | 1100 |
| Crystalline 1-3-8 SALP | 1138 |

The above data show the spray dried SALP produced cake volume comparable to other baking powder. No notable differences in flavor and texture were found for the cakes prepared using different baking acid.

EXAMPLE 2

Three batches of a 55% SALP solution, 4.75 Kg each, were prepared following a procedure substantially the same as that described in Example 1, except 24 g of $Al_2(SO_4)_3 \cdot 16H_2O$ was added at the beginning of the solution preparation. The additive produces 0.5% of $Al_2(SO_4)_3$ based on the quantity of SALP in the mixture. All three completely reacted reaction mixtures were clear. These examples demonstrate that the incorporation of a soluble sulfate or phosphate in accordance with its invention inhibits the formation of "white precipitate" in SALP reaction mixtures.

The reaction mixtures were cooled to room temperature and diluted with room temperature water to 40% SALP, then spray dried at an outlet temperature of 175° C. The product showed a fogged x-ray diffraction pattern with 7 minor peaks. The moisture content was 1.4%. Accordingly, the product is deemed to have the following empirical formula:

$NaAl_3H_{14}(PO_4)_8 \cdot 0.7H_2O$

EXAMPLE 3

One batch of a 55% SALP reaction mixture was prepared similar to Example 2 except the mixture contained 0.5% $Na_2SO_4$, instead of 0.5% $Al_2(SO_4)_3$. The completely reacted solution was clear. After diluting to 40% SALP, amorphous SALP was recovered by spray drying at 175° C. The product showed a fogged x-ray pattern with 11 minor peaks. The moisture content was 1.8%.

EXAMPLE 4

A series of experiments similar to Example 1 was carried out except the clear concentrated SALP solution was diluted to 25% SALP and the diluted solution was mixed with an additive prior to spray drying at an outlet temperature of 150° C. Products recovered showed a fogged x-ray diffraction pattern with some minor peaks (not all products were analyzed). Results are tabulated below.

| ADDITIVE | NUMBER OF MINOR XRD PEAKS | BULK DENSITY g/cc | MOISTURE, % |
|---|---|---|---|
| None | — | 0.41 | 2.8 |

| ADDITIVE | NUMBER OF MINOR XRD PEAKS | BULK DENSITY g/cc | MOISTURE, % |
|---|---|---|---|
| 5% Ca(H$_2$PO$_4$)$_2$·H$_2$O | — | 0.38 | 4.6 |
| 3% Ca$_5$(PO$_4$)$_3$OH | 6 | 0.2 | 5.2 |
| 0.4% K$_2$SO$_4$ | — | 0.42 | 3.4 |
| 1% KH$_2$PO$_4$ | 6 | 0.45 | 4.0 |
| 5% Crystalline NaAl$_3$H$_{14}$(PO$_4$)$_8$·4H$_2$O | 11 | 0.43 | 2.4 |

The above table showed additives influenced the bulk density and moisture content of the product.

EXAMPLE 5

An experiment similar to Example 1 was carried out except the concentrated SALP mixture contained 1% excess H$_3$PO$_4$ based on the amount of SALP in the mixture. The completed reacted and cooled mixture was clear. Calculated amounts of Ca(OH)$_2$ were then added with agitation to the reaction mixture to neutralize the excess H$_3$PO$_4$ forming Ca(H$_2$PO$_4$)$_2$. The neutralization reaction took about 3.5 hours at room temperature. The resulting clear mixture, which contained 55% SALP and had a viscosity of 0.5 Pa.S (500 cps) at room temperature, was warmed to 60° C. to reduce viscosity to 0.2 Pa.S (200 cps), then spray dried at an outlet temperature of 125° C. The product showed a completely fogged x-ray diffraction pattern and had a moisture content of 6.2%.

The layer cake recipe in testing the leavening action of the herein 1-3-8 SALP was prepared from the following ingredients.

| INGREDIENT | GRAMS | | |
|---|---|---|---|
| Cake Flour | 420 | Mixer: | Hobart N50 |
| Sugar | 504 | | |
| Baking Powder* | 18.6 | Mix: | Speed 1 - 30 seconds |
| Salt | 5.2 | | Speed 2 - 2 minutes |
| Shortening | 170 | | Scrape down |
| Milk | 226 | | |
| Vanilla | 7 ml | | |
| Milk | 114 | Mix: | Speed 1 - 5 seconds |
| Dry egg whites | 25 | | Scrape down |
| Water | 175 | | Speed 2 - 2 minutes |

Scale three layers at 397 grams per layer.
Bake at 350° F. for 35 minutes immediately after scaling.

*Baking powder containing SALP, NaHCO$_3$, CaSO$_4$ and cornstarch.

What is claimed is:
1. A method of spray drying 1-3-8 sodium aluminum phosphate reaction mixtures comprising the steps:
   A. forming an aqueous 1-3-8 SALP reaction mixture by reacting Na$_2$CO$_3$, Al(OH)$_3$ and H$_3$PO$_4$ in an Na:Al:PO$_4$ atomic ratio of 1:3:8 at a water content between about 30% and about 48% and in the presence of an effective amount of a non-toxic, substantially, water soluble metal sulfate as a precipitation inhibitor;
   B. adding sufficient water to the precipitation free, clear 1-3-8 SALP reaction mixture from step A to ensure a SALP content of from about 10% to about 55%;
   C. spray drying the 1-3-8 SALP solution of step B, and
   D. recovering the spray dried product.
2. The method of claim 1 wherein the precipitation inhibitor is selected from the class consisting of Al$_2$(SO$_4$)$_3$ and Na$_2$SO$_4$.
3. The method of claim 1 wherein the concentration of SALP after dilution is from about 25% to about 40%.
4. The method of claim 1 wherein the spray drying is effected at an outlet temperature of from about 100° C. to about 250° C.
5. The method of claim 4 wherein the spray drying is effected at an outlet temperature of from about 125° C. to about 175° C.
6. The method of claim 1 wherein SALP solutions of step B having a SALP concentration greater than about 40% are heated to reduce viscosity prior to spray drying.
7. The method of claim 1 wherein Ca(H$_2$PO$_4$)$_2$·H$_2$O (monocalcium phosphate) is added as a supplemental baking acid to the SALP solution of step B.

* * * * *